United States Patent
Huffman et al.

(10) Patent No.: US 9,652,547 B2
(45) Date of Patent: *May 16, 2017

(54) FRAMEWORK FOR SUGGESTING SEARCH TERMS

(71) Applicant: Google Inc., Mountain View, CA (US)

(72) Inventors: Scott Huffman, Redwood City, CA (US); Rehan Khan, Lafayette, CA (US); Uri Bernstein, Tel Aviv (IL); Natalia Marmasse, Ichud (IL)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,038

(22) Filed: Sep. 15, 2014

(65) Prior Publication Data
US 2014/0379689 A1    Dec. 25, 2014

Related U.S. Application Data

(63) Continuation of application No. 12/960,976, filed on Dec. 6, 2010, now Pat. No. 8,856,115.

(60) Provisional application No. 61/267,412, filed on Dec. 7, 2009.

(51) Int. Cl.
  *G06F 17/30*    (2006.01)
  *G06F 7/00*    (2006.01)

(52) U.S. Cl.
  CPC ...... *G06F 17/3087* (2013.01); *G06F 17/3064* (2013.01)

(58) Field of Classification Search
  None
  See application file for complete search history.

(56) References Cited

U.S. PATENT DOCUMENTS

| | | | |
|---|---|---|---|
| 5,930,474 A * | 7/1999 | Dunworth et al. | 709/217 |
| 6,564,213 B1 * | 5/2003 | Ortega et al. | |
| 6,701,309 B1 * | 3/2004 | Beeferman | G06F 17/30646 |
| 6,704,727 B1 * | 3/2004 | Kravets | |
| 7,565,157 B1 * | 7/2009 | Ortega et al. | 455/456.2 |
| 7,685,119 B2 | 3/2010 | Riise et al. | |
| 7,752,326 B2 * | 7/2010 | Smit | 709/231 |
| 7,774,002 B1 * | 8/2010 | Ortega et al. | 455/456.2 |

(Continued)

*Primary Examiner* — Jeffrey A Burke
(74) *Attorney, Agent, or Firm* — Marshall, Gerstein & Borun LLP

(57) ABSTRACT

Methods, systems, and apparatus, including computer programs encoded on computer storage media, for presenting local query suggestions. In general, one aspect of the subject matter described in this specification can be embodied in methods that include the actions of determining a general location and a specific location for a client device. Methods also include while receiving a query stem, and before receiving an input submitting a query to the search engine, obtaining general queries containing the query stem, each general query having a first quality measure. Methods also include obtaining local queries containing the query stem, each local query having a second quality measure. Methods also include combining at least one of the general queries and at least one of the local queries into combined queries, the combined queries having a presentation order based on the respective quality measures of the queries. Methods also include presenting the queries.

20 Claims, 7 Drawing Sheets

(56) References Cited

U.S. PATENT DOCUMENTS

| | | | |
|---|---|---|---|
| 7,805,450 B2* | 9/2010 | Delli Santi et al. | 707/754 |
| 7,836,044 B2* | 11/2010 | Kamvar et al. | 707/713 |
| 8,112,529 B2* | 2/2012 | van den Oord et al. | 709/227 |
| 8,312,010 B1* | 11/2012 | Chen et al. | 707/723 |
| 8,489,625 B2* | 7/2013 | Ni et al. | 707/758 |
| 8,856,115 B1* | 10/2014 | Huffman et al. | 707/733 |
| 2006/0085392 A1* | 4/2006 | Wang et al. | 707/3 |
| 2006/0206454 A1* | 9/2006 | Forstall et al. | 707/3 |
| 2006/0271531 A1* | 11/2006 | O'Clair et al. | 707/5 |
| 2006/0290535 A1* | 12/2006 | Thiesson et al. | 341/22 |
| 2007/0088897 A1* | 4/2007 | Wailes et al. | 711/3 |
| 2007/0255552 A1* | 11/2007 | Thiesson et al. | 704/8 |
| 2008/0154856 A1* | 6/2008 | Riise et al. | 707/3 |
| 2008/0154888 A1* | 6/2008 | Buron et al. | 707/5 |
| 2008/0168033 A1* | 7/2008 | Ott et al. | 707/3 |
| 2009/0106681 A1* | 4/2009 | Gupta et al. | 715/771 |
| 2009/0169060 A1* | 7/2009 | Faenger et al. | 382/113 |
| 2010/0114908 A1* | 5/2010 | Chand | G06F 17/30864 707/748 |
| 2010/0118025 A1* | 5/2010 | Smith et al. | 345/418 |
| 2010/0201707 A1* | 8/2010 | Rasmussen et al. | 345/620 |
| 2010/0205207 A1* | 8/2010 | Dharmarajan et al. | 707/769 |
| 2010/0293174 A1* | 11/2010 | Bennett | G06F 17/30707 707/759 |
| 2012/0047135 A1* | 2/2012 | Hansson et al. | 707/731 |
| 2012/0158289 A1* | 6/2012 | Bernheim Brush et al. | 701/425 |

* cited by examiner

FRAMEWORK FOR SUGGESTING SEARCH TERMS

CROSS-REFERENCE TO RELATED APPLICATIONS

This application is a continuation of U.S. patent application Ser. No. 12/960,976, filed 6 Dec. 2010, which claims the benefit of U.S. Provisional Applications 61/267,412, filed 7 Dec. 2009. The above-referenced applications are incorporated herein by reference.

BACKGROUND

This specification relates to providing information relevant to user search queries.

Internet search engines identify resources, e.g., Web pages, images, text documents, and multimedia content, in response to queries submitted by users and present information about the resources in a manner that is useful to the users.

Users of search engines are often interested in information specific to their location. For example, users may want to know the local weather, may be interested in local politics or sports. Some topics which are interesting to users of one location are less interesting to users in a different location.

A search engine allows a user to provide an input for which search results are returned in response. Some search engines can provide suggestions to the user based upon the search query the user entered. For example, some search engines provide search query suggestions based upon the current search query.

SUMMARY

The specification describes technologies relating to presenting local query suggestions.

In general, one aspect of the subject matter described in this specification can be embodied in methods that include the actions of determining a general location and a specific location for a client device interacting with a search engine. Methods also includes the actions of while receiving a query stem in a search engine query input field of the search engine user interface presented on the client device, and before receiving an input submitting the query stem as a query to the search engine, obtaining, in a data processing system, a plurality of general queries containing the query stem, each general query having a first quality measure in reference to the general location; obtaining, in a data processing system, a plurality of local queries containing the query stem, each local query having a second quality measure in reference to the specific location; and combining at least one of the plurality of general queries and at least one of the plurality of local queries into a plurality of combined queries, the combined queries having a presentation order based on the respective quality measures of the queries. Methods also include the actions of presenting the queries. Other embodiments of this aspect include corresponding systems, apparatus, and computer programs recorded on computer storage devices, each configured to perform the operations of the methods.

These and other embodiments can each optionally include one or more of the following features. The first quality measure may include, for each query, a measure of popularity of the query in the general locations, and the second quality measure may include, for each query, a measure of popularity of the query in the specific location. The measure of popularity for the given query may be a ratio between a number of previously submitted queries which match the given query and the number of previously submitted queries which contain the query stem.

Obtaining a plurality of local queries containing the query stem may include identifying an area of high quality for a local query, determining the specific location is within the area, and associating the local query in the plurality of local queries. The area of popularity may be represented by a spatial distribution of query occurrence. The spatial distribution is represented by a bivariate Gaussian distribution. The specific location may be determined using at least one of Internet Protocol address, Global Positioning System coordinates, or proximity to a cellular tower. The specific location may be determined using at least one of prior queries from the client device and user profile information.

Blending may include identifying a query present in the plurality of general queries and present in the plurality of local queries, determining the difference between first quality measure of the query and the second quality measure of the query exceeds a threshold, and promoting the query in the plurality of combined queries.

Combining may include determining a local query present in the plurality of local queries represents is a refinement of a general query present in the plurality of general queries, and promoting the local query in the plurality of combined queries. The specific location may be defined by population.

Particular embodiments of the subject matter described in this specification can be implemented so as to realize one or more of the following advantages. Relevant query suggestions may be obtained before the user completes his or her search query. Query suggestions may reflect local interests, while maintaining the reliability inherent in query suggestions determined from a larger population base. Query suggestions may reflect the interests of searchers in geographic areas of varying sizes, from less than a few square miles to cities to metro areas to states. Query suggestions may reflect interests independent of arbitrary geopolitical boundaries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
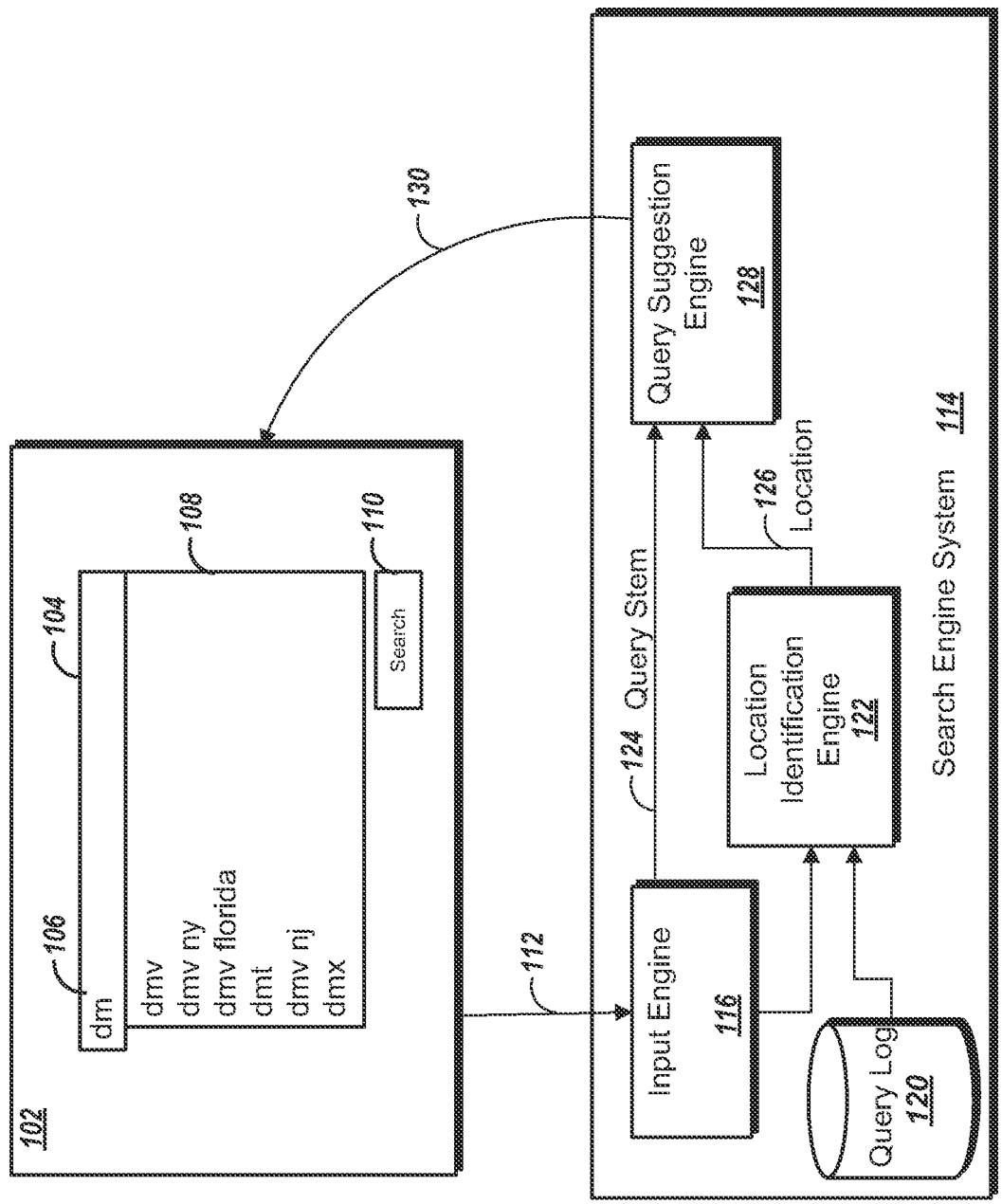
FIG. 1 illustrates an example query suggestion system.

FIG. 1 illustrates an example query suggestion system. In this example, a user interface 102 is displayed on a client device for use by a user. The user interface contains a text input field 104 for entering search queries. The user interface contains a graphical button 110 which is used to submit a completed search request to a search engine system 114.

Through conventional client scripting the user interface also sends a query stem 106 entered in the text input field to the search engine system before the query is submitted. An input engine 116 of the search engine system receives the query stem through network request 112. The user interface may be, for example, a web page running in a web browser, a toolbar running in a web browser, or an independent search client running on the client device. Certain data may be anonymized in one or more ways before it is stored or used.

The network request 112 may contain other information, in addition to the query stem. For example, the network request may contain the Internet Protocol Address (IP Device) of the client device. In the scenario where the client device is a mobile device, the user may also permit the network request to include the GPS coordinates of the client device and information relating to cellular or network request of the device, for example, the cellular towers with which the device is communicating.

The search engine system includes an input engine 116 which processes the network request. The input engine determines that the network request contains a query stem and not a completed query request. That is, that the client device has not sent a network request indicating that the user has finished entering input and that the search engine should identify search results responsive to the input in the query input field. The input engine can also consider other factors, for example, whether the query stem has a minimum number of characters and whether a predetermined amount of time has passed since the user entered the last character of the query stem. The input engine may also identify information in the network request which may be used to determine the location of the client device.

The location identification engine 122 receives location information from the input engine. The location identification engine determines a general location and a specific location for the client device. The location identification engine may do so using information in the network request. For example, the location identification engine may use conventional techniques to determine a location from the IP address or GPS coordinates.

When information in the network request is insufficient, or in implementations where the location identification engine does not use information in the network request, the location identification engine may determine a location of the client device based on information in a query log 120 concerning interactions between the user of the client device and the search engine system. In some implementations for Web clients, the user may be identified by use of cookies or other state-preserving techniques, over a short session or over longer periods of time. For example, the location identification engine may receive data indicating the user had previously searched for "Palo Alto High School" and, since users in other locations are unlikely to search for "Palo Alto High School," determine that the user is most likely in or near Palo Alto. In some scenarios, a single query may not be sufficient to unambiguously determine a location, for example, a user searching for "Fremont High School" may be either from Sunnyvale, Calif. or Los Angeles, Calif. The location identification engine may rely on multiple recent queries, for example to determine a location. Once a location is identified, the location identification engine may send the input data and the location to a query suggestion engine 128.

The location identification engine determines a general location of the client device, for example, the country where the device is located, and a specific location of the client device, for example, the city, county, population center, block, street, or addresses where the client device is located. Both the general location and the specific location are communicated to a query suggestion engine 128.

Figure 2:
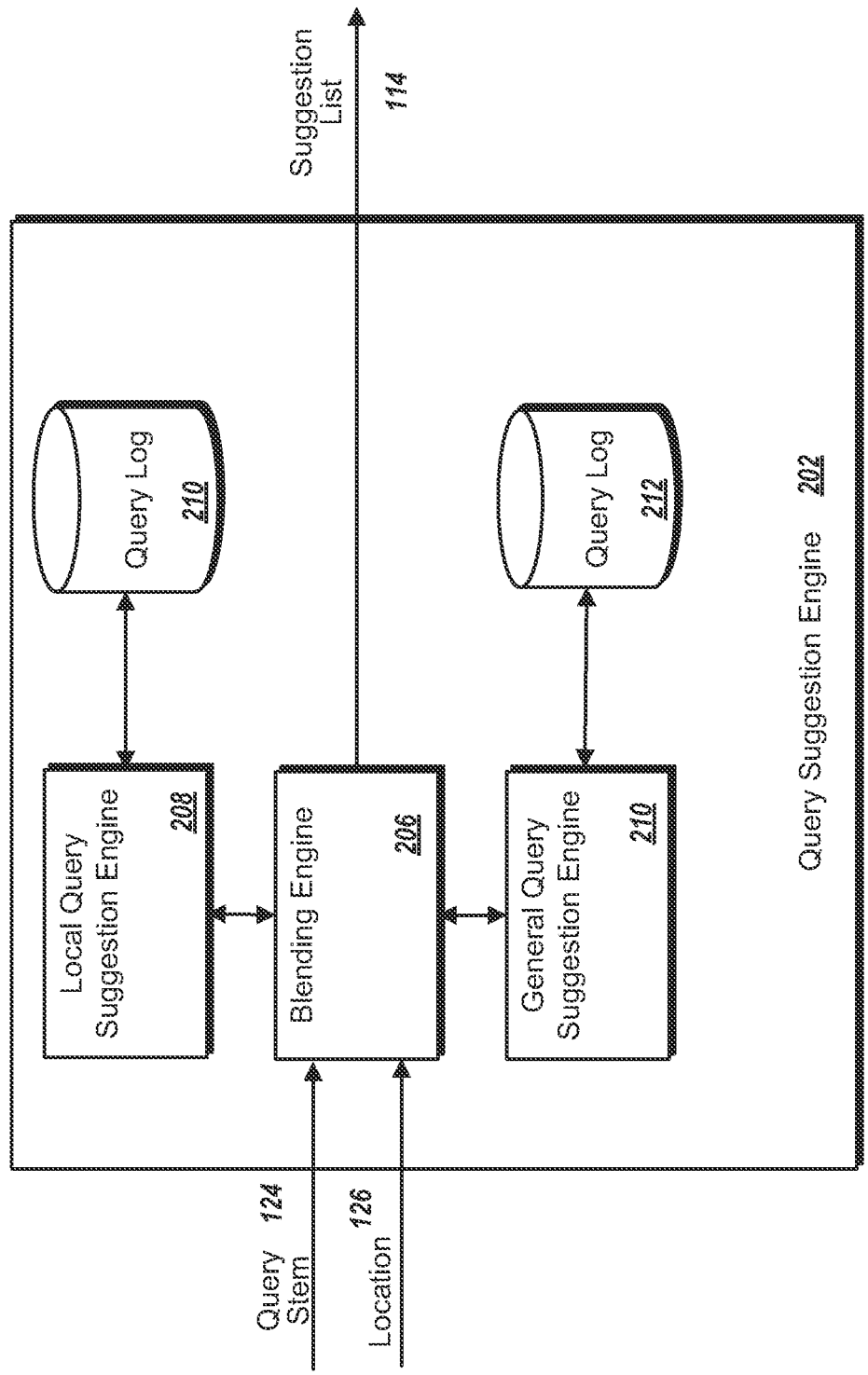
FIG. 2 illustrates an example query suggestion engine.

The query suggestion engine, describe in more detail below, receives the query stem, the general location, and the specific location, FIG. 2 illustrates an example query suggestion engine 202. The example query suggestion engine 202 is an example of the query suggestion engine 128 described above (FIG. 1).

The query suggestion engine 202 includes a blending engine 206, a local query suggestion engine 208, and a general query suggestion engine 210. The local query suggestion engine obtains a list of local query suggestions based on the query stem 124, the specific location of the user 126, and query log data including information about previously submitted queries that were submitted from a location which is close to the user's specific location. As discussed above, the location of each submitted query can be identified. The previously submitted queries, as discussed below, are associated with a geographic area in which the query is likely to be a high quality query. In some implementations, the geographic area may be defined by geopolitical boundaries, for example, Santa Clara County or Palo Alto city. In other implementations, the geographic area may be defined by population centers, for example the San Francisco Bay Area. In other implementations, each query may be associated with a separate geographic area which defines a region for which the query has a high quality metric. For example, the query "Palo Alto High School" may be a high quality query within the Palo Alto Unified School District, but may rapidly fade in quality outside the district. In this case, the query may be associated with a geographic area which mirrors school district. In some implementations, as described below, the geographic area may be represented by a spatial distribution of query occurrence.

The local query suggestion engine looks at query data stored over a period of time to determine previous queries which contain the query stem. The query data includes how frequently the queries were submitted in the past, the locations from which the queries were submitted and other information about the queries' quality. The previous queries are then ranked based on a combination of their frequency, quality, and location relative to the user.

The local query suggestion engine looks at query data stored over a period of time, for example, one week, one month, three months, six months, or one year The query stem may occur anywhere in the previously received queries, for example, a query stem of "dmv" would match both "California dmv" and "DMV Oregon." As new queries are submitted the query data is updated to reflect the submissions.

Information about the queries' quality could include information reflecting how the search result is accessed, e.g., the resources the user selects, the positions of the selected resource in the resource list (for example, the first resource, the second resource . . . ), and the resources which are ignored.

Generally, the quality of a query includes a measure of the popularity of the query and the quality of the results the query produces. For example, a query for which the top results are frequently selected may be determined to have high quality; similarly, a query for which no results are typically selected would have low quality.

The local query suggestions may be filtered to remove inappropriate queries or queries known to produce inaccurate results. All or a subset of the list of local queries is returned to the blending engine. In some implementations, all the local queries are delivered to the blending engine. In other implementations only a specific number of local queries are delivered.

The general query suggestion engine 210 obtains a list of general query suggestions based on the query stem 124 using conventional means. For example, general query suggestions may be obtained by the methods described in U.S. Pat. No. 7,487,145, "Method and System for Autocompletion Using Ranked Results" filed Nov. 11, 2004.

The popularity of a given query is determined from the number of times one or more users has submitted a search for the query. For example, the popularity can be the ratio of the number of times one or more users have submitted a search for the query and the total number of times the one or more users have submitted queries containing the query stem. For example, $$\text{popularity}(\text{query } x) = \frac{\text{number of times users submit query } x}{\sum_i \text{number of times users submit query } i}$$

where query x is the query for which the popularity is being calculated, and each query i is a query in the group of query suggestions containing the query stem.

Other formulas for determining the popularity value may also be used. For example, the local query suggestion engine may optionally weight the number of times users submit each query by a measure of the quality of each query. The measure of quality can be determined, for example, from the number of times users select search results after issuing their queries, how long users view search results responsive to their queries, how often users refine their queries, and whether users interacted with other features of search result pages presented in response to their queries. In some implementations, the denominator may be the sum of all queries submitted within the local area. In other implementations, the denominator may be the population of the local area. The same query submitted one hundred times per day in a sparsely populated area is a higher quality query than one submitted one hundred times per day in a densely populated area.

Figure 3A:
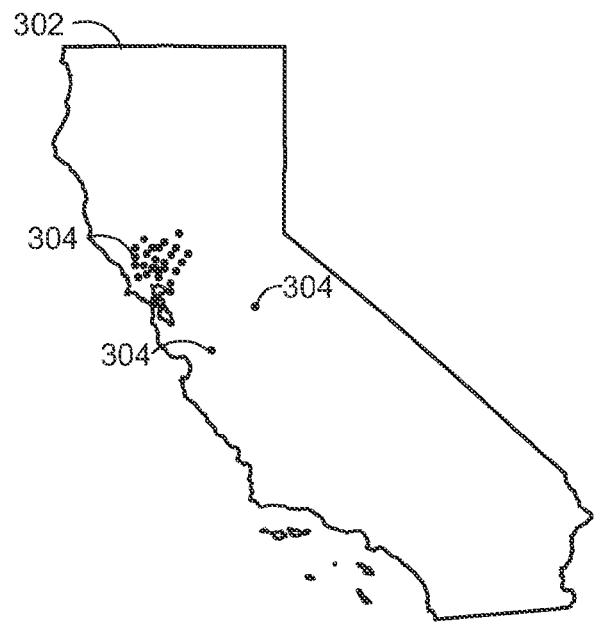
FIGS. 3A-C illustrates an example of determining a geographical area for a query.
Figure 3B:
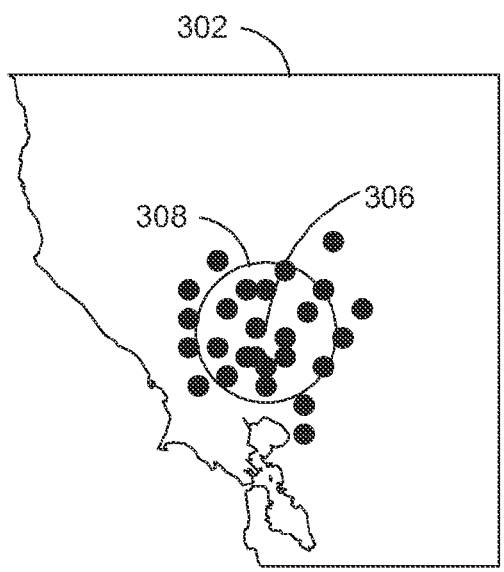
Figure 3C:
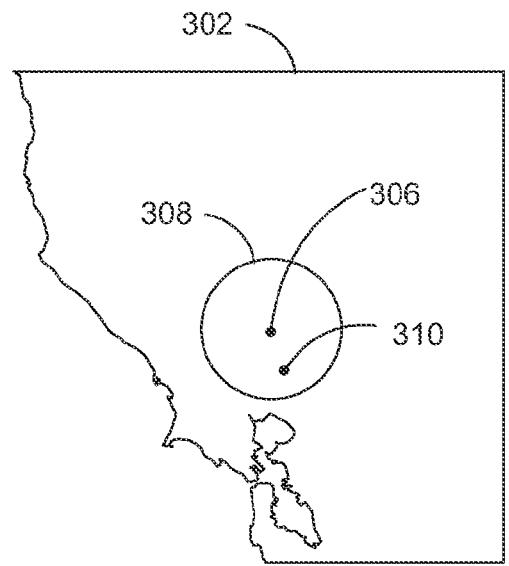

In some implementations, the geographical area for an individual query may be determined from an analysis of historical query submissions. FIGS. 3A-C illustrate an example of determining a geographical area for a query. A geographic area 302 is shown, here, the state of California. The state of California is used for exemplary purposes only. The following area analysis is not limited to states, countries, or any particular geopolitical boundary. Within this area are tracked a number query submissions 304. For example, in some implementations user's may opt-in and permit their search activity to be monitored, in other implementations users may be provided the opportunity to opt-out from monitoring. For some query submission, using conventional methods of statistical cluster analysis, areas where a particular query is popular may be identified. FIG. 3B shows a close up of the geographic area in FIG. 3A. For each identified cluster, a center 306 may be determined. And from the center, a circle 308 may be determined such that sixty-eight percent of the queries in the cluster fall within the area, or a single standard deviation away from the center. In FIG. 3C, the popularity of the query at a given location 310 may be defined by the overall popularity of the query and the distance between the location 310 and the center 306 of the circle 308. In general, how popular the query is determined to be depends on the distance between the location of the client device and the central location as well as how quickly the query loses quality. The effect of distance on the quality of the query at the location of the client device may be a function of a normalized standard distribution of the quality of the query as the distance moves away from the center.

For example, the popularity of a query x at location y may be defined as:

$$\text{popularity}(\text{query } x \text{ at } y) = (\text{popularity of query } x) \frac{1}{\sqrt{2\pi\sigma^2}} e^{-d^2/2\sigma^2}$$

Where σ is the standard deviation of the distribution, and d is the distance between point y and the center of the circle.

Other distribution functions may be used to determine the quality of the query at a given point based on spatial probability distributions. For example, an isotropic Gaussian distribution, a bivariate Gaussian distribution, or other conventional cumulative distribution functions may be used. In other implementations, mixtures of Gaussians or other distribution functions, wavelets, or polygons, or any other method of representing a spatial distribution may be used.

In another implementation, queries may be associated with a particular zip code. The quality of the query in a neighboring zip code is determined through use of a blurring function.

Figure 4A:
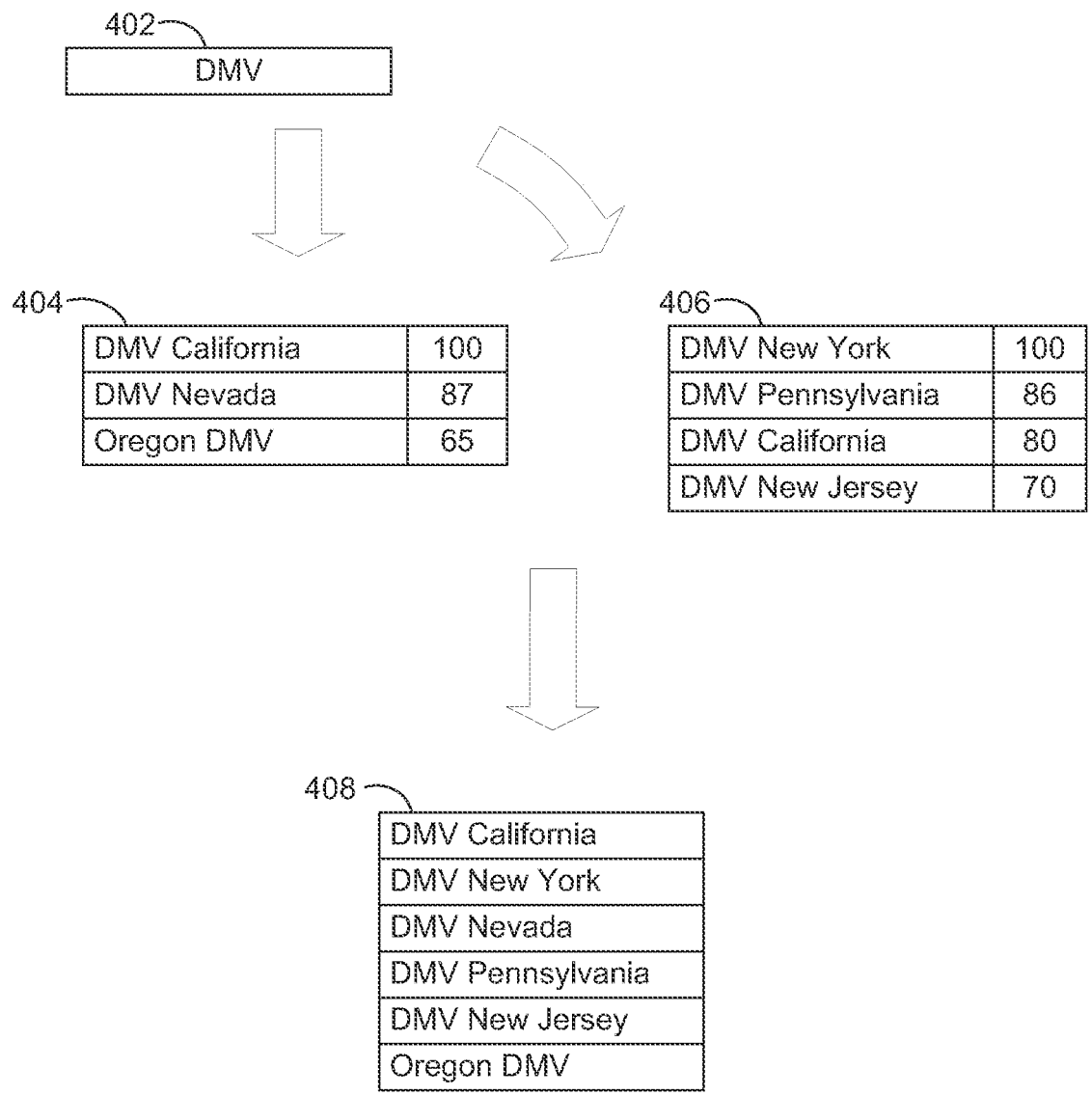
FIGS. 4A-C illustrates examples of obtaining and presenting local query suggestions to a user.
Figure 4B:
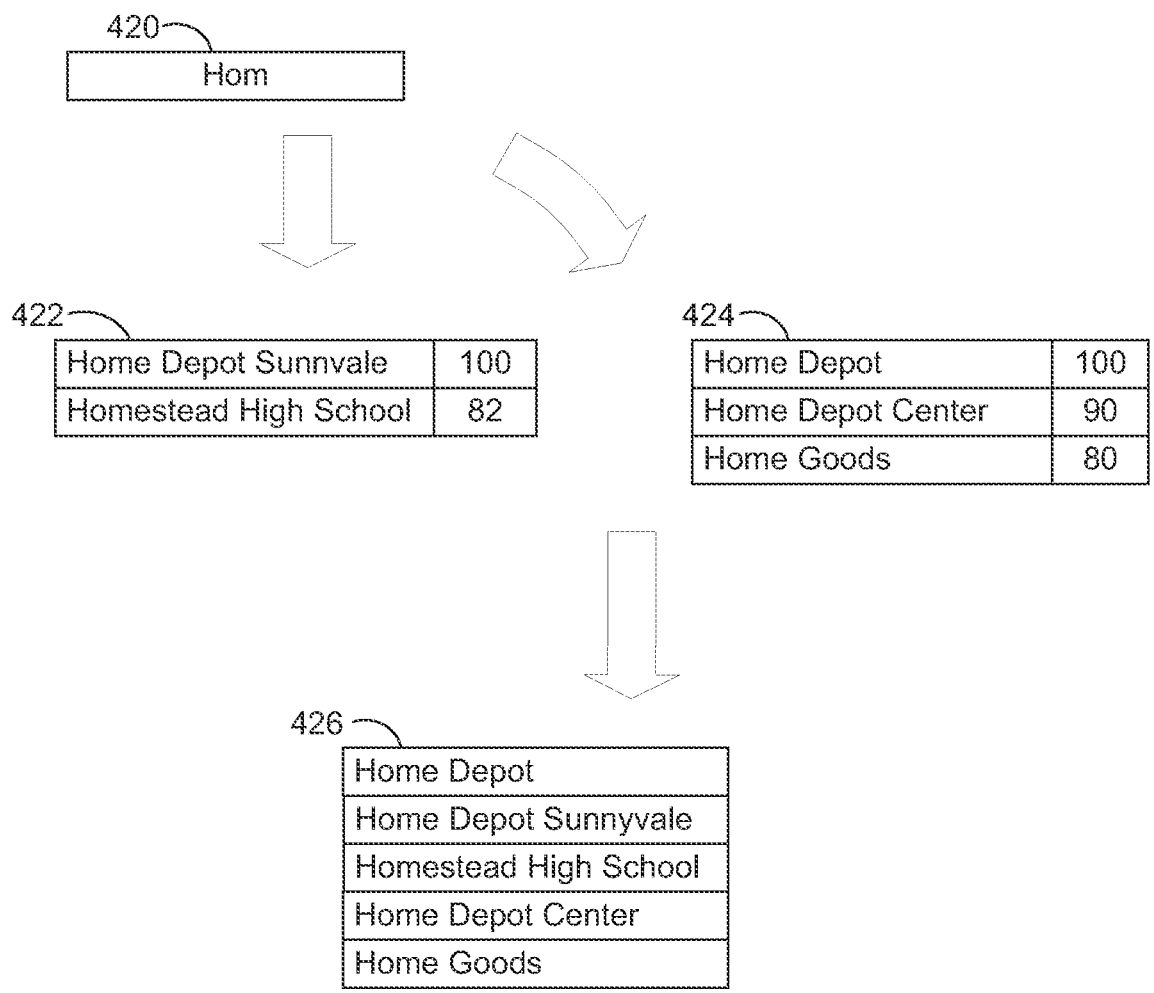
Figure 4C:
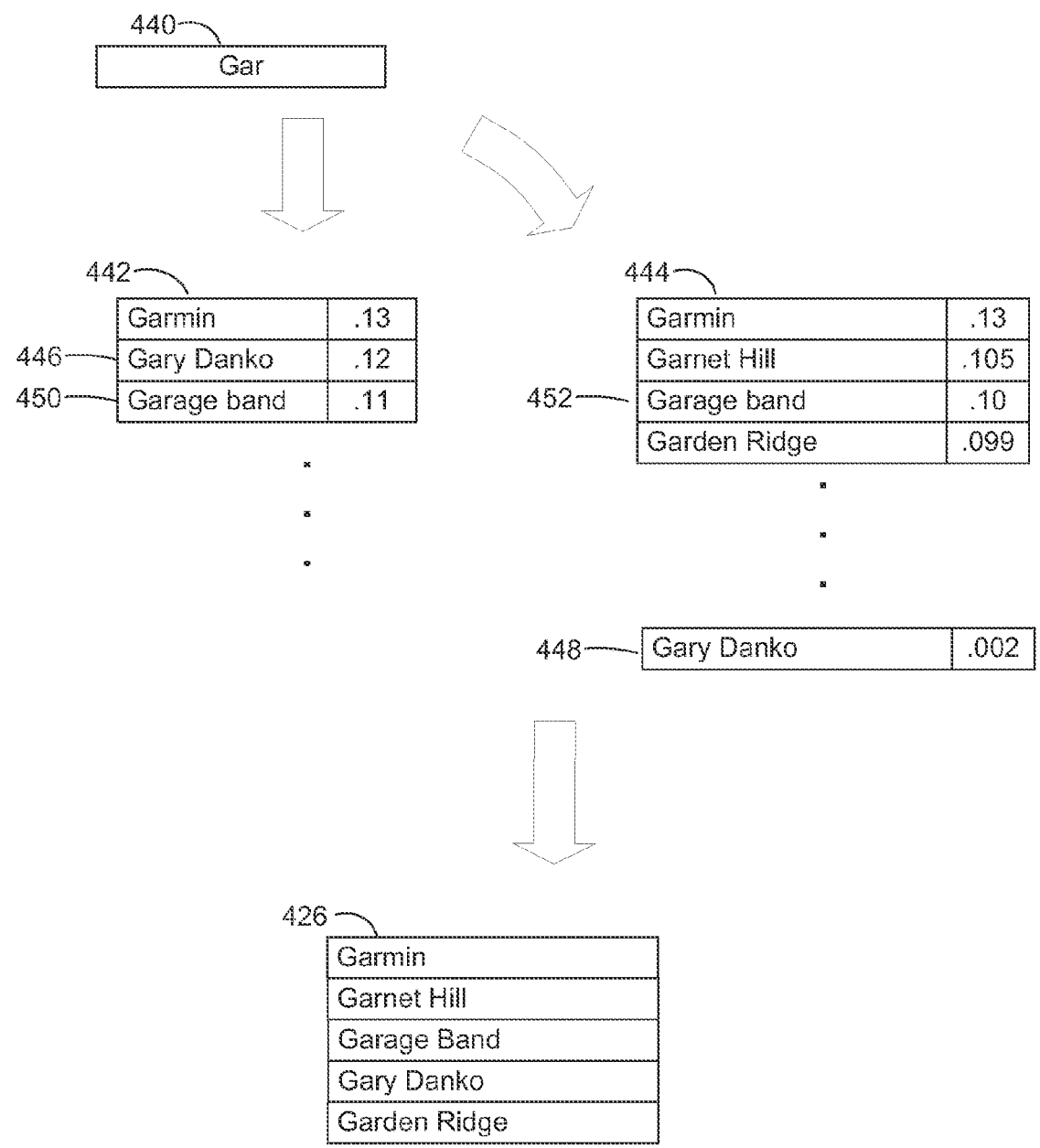

The blending engine 206 accepts a list of local query suggestions accompanied by quality metrics from the local query suggestion engine 208 and a list of general query suggestions accompanied with quality metrics from the general query suggestion engine 210. The blending engine combines the list of local query suggestions and the general query suggestion engine using the quality metrics. In some implementations, the local query suggestions and the list of general query suggestions may be combined based on popularity. FIGS. 4A-C illustrate examples of obtaining and presenting local query suggestions to a user. FIG. 4A shows that a query stem 402 of "DMV" may produce a list of local query suggestions 404 which include "DMV California", "DMV Nevada" and "Oregon DMV." The same query stem produces a list of general query suggestions 406 including "DMV New York", "DMV Pennsylvania", "DMV California", and "DMV New Jersey." In this example, the blended list of query suggestions 408 includes the suggestions from both lists in an order based on the quality scores of the individual query suggestions. In some implementations, local query suggestions may be favored over general query suggestions.

In other implementations, a number of local queries, for example three, may be added to the blended list before any general query suggestions are added. In other implementations, the blending engine recognizes local query suggestions which are more specific versions of general query suggestions and promotes the more specific local query above or directly below the general query. In FIG. 4B, the query stem 420 "Hom" produces a list of local query suggestions 422 including "Home Depot Sunnyvale" and "Homestead High School." The query stem produces a list of general query suggestions 424 "Home Depot", "Home Depot Center", and "Home Goods." The blending engine recognizes that "Home Depot Palo Alto" is a more specific version of the "Home Depot" query from the list of general query suggestions. In this example, the blending engine creates the blended list of query suggestions 426 and places the more specific query suggestion "Home Depot Sunnyvale" right below the query suggestion "Home Depot." Also in this example, the blending engine may also recognize "Homestead High School" as being a query very specific to the local area and, in this example, promotes "Homestead High School" above "Home Depot Center" for that reason.

In other implementations, the quality scores of local query suggestions are compared to the quality scores of corresponding general query suggestion in the list of general query suggestions. The local query suggestion is promoted (given a higher place) if the ratio between the general query quality metric and the local query quality metric exceeds a given threshold. For example, in FIG. 4C, a query stem 440 "Gar" produces a list of local query suggestions 442 including "Garmin", "Gary Danko"446, and "Garage band" 450, while the query stem produces a list of general query suggestions 444 including "Garmin", "Garage Band" 452, "Garden Ridge", "Garnet Hill", and "Gary Danko" 448 among others. In this example, the local suggestion for "Gary Danko" 446 has a quality score of 0.12 while the general suggestion for "Gary Danko" 448 has a quality score of 0.002. Assuming the threshold to promote a local query is 0.08, the difference between the local suggestion and the general suggestion is sufficiently large to cause the position of the query to be promoted in the blended suggestions 426. In contrast, the local query suggestion for "Garage Band' 446 has a quality score of 0.11 and the general query suggestion for "Garage Band" 452 has a quality score of 0.10. While the quality score for the local query suggestion exceeds the quality score for the general query suggestion the difference does not exceed the required threshold of 0.08 and the result is not promoted.

Promoting a local query suggestion in the list of blended query suggestions does not require promoting the local query suggestion to the same position in the blended query suggestion as it held in the local query suggestions. In some implementations, the comparison of the quality scores may be a percentage comparison, for example the local query quality metric divided by the general query quality metric. In other implementations, the comparison of the quality scores may be a difference, for example subtracting the general query quality metric from the local query quality metric. In some implementations, if the general query quality metric exceeds the local query quality metric by a threshold, the general query suggestion may be demoted.

There may be substantial overlap between the local query suggestions and the general query suggestions. For example, "Disney Land" is likely to be an equally good query suggestion among the local query suggestions and among the general query suggestions. At the same time, the local query results reflect query activity by a relatively small population of users, and may, therefore, be skewed by the idiosyncratic search habits of a relatively small number of individuals. Therefore, once the popularity of the local query suggestions falls below a threshold level, the blending engine may elect to prefer general query suggestions over local ones.

Figure 5:
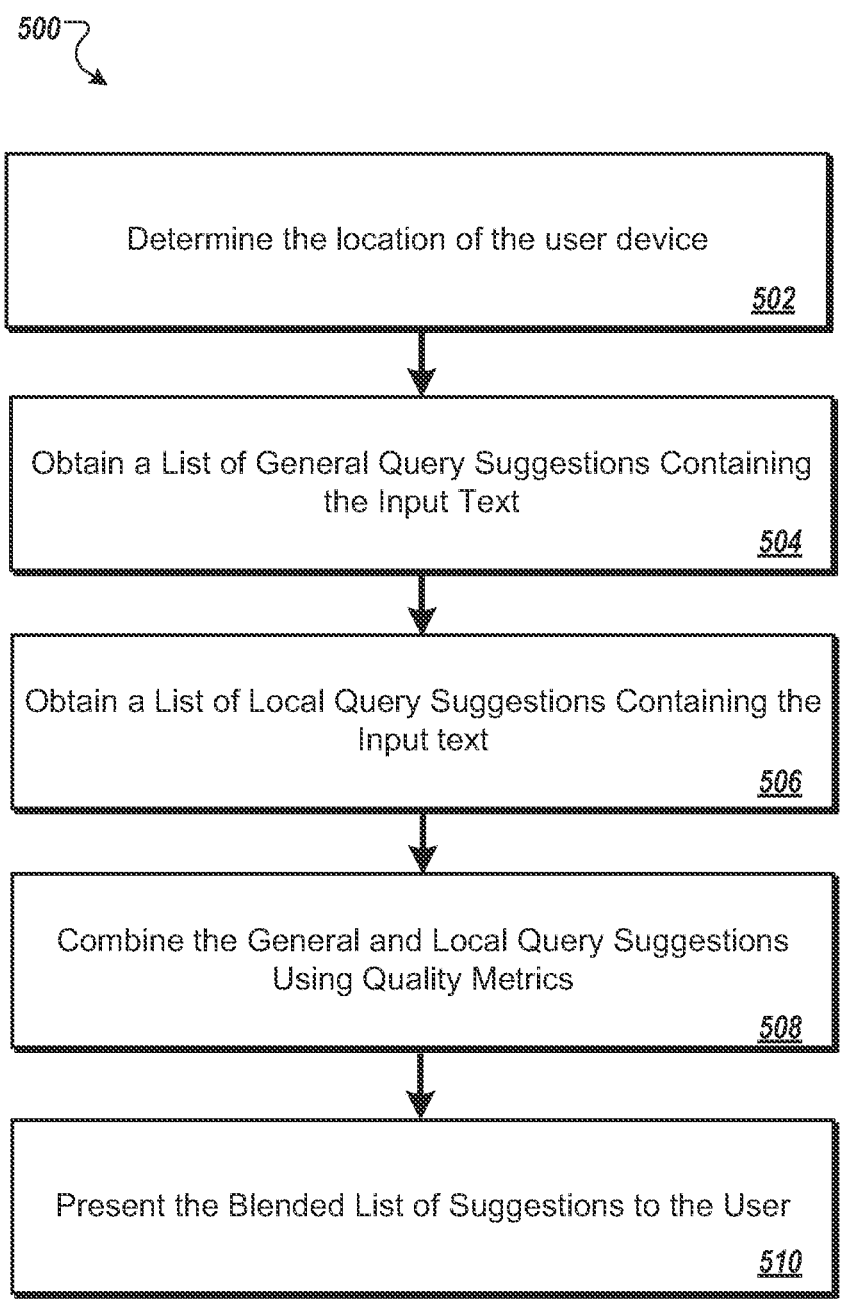
FIG. 5 shows a flowchart that represents operations of a query suggestion engine.

FIG. 5 shows a flowchart that represents operations of a query suggestion engine. For convenience, the operations will be described with reference to a system that performs the operations. The system can be, for example, the search engine system 102 described in reference to FIG. 1, including the query suggestion engine 202 described with reference to FIG. 2.

The operations are performed while the system receives text input entered in a search engine query input field, and before the user submits a search request for the text input. The input can be received, for example, as described above with reference to FIG. 1. The system determines the location of a client device 502, as described above with reference to FIG. 2. The system obtains a list of general query suggestions containing the input text 502, for example, as described above with reference to FIG. 2. The system obtains a list of local query suggestions containing the input text 504, for example, as described above with reference to FIG. 2. The system combines the general and local query suggestions using quality metrics, 506, for example, as described above with reference to FIG. 2. The system presents the combined list of suggestions to the user 508, for example, as described above with reference to FIG. 1.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "engine" encompasses any data processing apparatus configured to perform the operations described herein. In general, an engine will be implemented as a software module running on one or more computers and configured to interact with other components of the system.

The term "data processing apparatus" encompasses all kinds of apparatus, devices, and machines for processing data, including by way of example a programmable processor, a mobile device, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. The actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of suggestion query completions before a user completes a query request, the method comprising:
    receiving, at a search engine system, a network request from a client device;
    ascertaining a general location and a specific location of the client device, the specific location being a more specific indication of the location of the client device than the general location;
    determining that the network request contains a query stem and not a completed query request;
    obtaining general queries containing the query stem;
    obtaining local queries containing the query stem and corresponding to the specific location;
    in response to determining that the network request contains the query stem, selecting, with one or more processors of the search engine system, suggested queries by performing steps comprising:
        selecting some of the suggested queries from among the general queries based on popularity of the general queries in an area corresponding to the general location, selecting some of the suggested queries from among the local queries based on popularity of the specific queries in an area corresponding to the specific location, and selecting one of the suggested queries from among the local queries in response to determining that the local query is a refinement of one of the general queries; and sending the suggested queries to the client device before the client device receives an input from the user submitting the completed query request.

2. The method of claim 1, comprising:

determining, among the suggested queries, which of the suggested queries are more specific versions of other ones of the suggested queries defining more general versions; and arranging the suggested queries so that the more specific versions are organized according to the more general versions.

3. The method of claim 2, wherein arranging the suggested queries comprises:

arranging the suggested queries in an ordered list in which at least some of the more specific versions are adjacent the more general versions.

4. The method of claim 1, wherein determining that the network request contains the query stem comprises:

determining that more than a threshold amount of characters are present in the query stem.

5. The method of claim 1, wherein determining that the network request contains the query stem comprises:

determining that more than a threshold amount of time has elapsed since a last character was added to the query stem.

6. The method of claim 1, comprising:

ranking at least some of the local queries based on relative locations between the specific location and locations where the local queries were previously submitted; and selecting some of the suggested queries from among the local queries based on the ranking.

7. The method of claim 1, comprising:

selecting some of the suggested queries from among the local queries based on quality of search results of the local queries indicated by previous user responses to the search results.

8. The method of claim 7, wherein the quality of search results for the local queries includes a measure of:

the rank of user-selected search results among lists of the search results;

the frequency with which users select the search results; and duration of view times of the search results following selections of the search results.

9. The method of claim 1, wherein the popularity of the specific queries in the area corresponding to the specific location is a function of both an amount of submissions of the respective specific queries from the area corresponding to the specific location and an amount of submissions of queries containing the query stem.

10. The method of claim 1, wherein the popularity of the specific queries in the area corresponding to the specific location is determined based on distances between the specific location and geographic clusters of submissions of respective specific queries.

11. The system of claim 1, wherein determining that the network request contains the query stem comprises:

determining that more than a threshold amount of characters are present in the query stem.

12. The method of claim 1, wherein selecting the suggested queries includes:

selecting one of the suggested queries from among the local queries in response to determining that a ratio of a quality score of the local query to a quality score of a corresponding general query exceeds a certain threshold, wherein the local query and the corresponding general query have common query text.

13. A system, comprising:

one or more processors; and memory storing instructions that when executed by at least some of the one or more processors cause operations comprising:

receiving, at a search engine system, a network request from a client device;

ascertaining a general location and a specific location of the client device, the specific location being a more specific indication of the location of the client device than the general location;

determining that the network request contains a query stem and not a completed query request;

obtaining general queries containing the query stem;

obtaining local queries containing the query stem and corresponding to the specific location;

in response to determining that the network request contains the query stem, selecting, with one or more processors of the search engine system, suggested queries by performing steps comprising:

selecting some of the suggested queries from among the general queries based on popularity of the general queries in an area corresponding to the general location, selecting some of the suggested queries from among the local queries based on popularity of the specific queries in an area corresponding to the specific location, and selecting one of the suggested queries from among the local queries in response to determining that the local query is a refinement of one of the general queries; and sending the suggested queries to the client device before the client device receives an input from the user submitting the completed query request.

14. The system of claim 13, wherein the operations comprise:

determining, among the suggested queries, which of the suggested queries are more specific versions of other ones of the suggested queries defining more general versions; and arranging the suggested queries so that the more specific versions are organized according to the more general versions.

15. The system of claim 14, wherein arranging the suggested queries comprises:

arranging the suggested queries in an ordered list in which at least some of the more specific versions are adjacent the more general versions.

16. The system of claim 13, wherein determining that the network request contains the query stem comprises:

determining that more than a threshold amount of time has elapsed since a last character was added to the query stem.

17. The system of claim 13, wherein the operations comprise:

ranking at least some of the local queries based on relative locations between the specific location and locations where the local queries were previously submitted; and selecting some of the suggested queries from among the local queries based on the ranking.

18. The system of claim 13, wherein the operations comprise:
selecting some of the suggested queries from among the local queries based on quality of search results of the local queries indicated by previous user responses to the search results.

19. The system of claim 13, wherein the popularity of the specific queries in the area corresponding to the specific location is a function of both an amount of submissions of the respective specific queries from the area corresponding to the specific location and an amount of submissions of queries containing the query stem.

20. The system of claim 13, wherein the popularity of the specific queries in the area corresponding to the specific location is determined based on distances between the specific location and geographic clusters of submissions of respective specific queries.

* * * * *